Patented Nov. 19, 1929

1,736,080

UNITED STATES PATENT OFFICE

HEINRICH HEIMANN AND HERMANN SEEFRIED, OF DESSAU IN ANHALT, IRNFRIED PETERSEN, OF WOLFEN KR. BITTERFELD, AND ALFONS BAYERL, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

PROCESS FOR OPENING UP MATERIALS CONTAINING CELLULOSE

No Drawing. Application filed July 7, 1927, Serial No. 204,137, and in Germany July 21, 1926.

The present invention is based on the observation that material containing cellulose, such as wood or straw, can be opened up in a simple manner and with very good yields by exposure to the vapour of nitric acid. For this purpose air is laden with nitric acid vapour and this mixture is allowed to act upon the material in question. The concentration of the nitric acid vapour in the atmosphere used may vary within wide limits. The material to be opened up can be preliminarily steamed in order to remove any resin and to facilitate the diffusion of the nitric acid by loosening the fibres.

A special manner for opening up the cellulose material consists in impregnating it with cold or warm dilute nitric acid and then subjecting it to a treatment with air. Instead of nitric acid, oxides of nitrogen in admixture with air may be used whereby nitric acid is formed in the fibres. This operation can be carried out at ordinary temperature or with application of heat.

The following examples illustrate the invention without limiting it:

*Example 1.*—Air of a temperature at 30–40° C. is passed through nitric acid of 60% strength and then over deal shavings contained in a tube. After some hours the opening-up is complete. The material is then boiled in the usual manner with an alkaline agent and there is obtained a cellulose of high degree of purity.

*Example 2.*—Steamed fir-wood is digested with cold nitric acid of 10% strength until it is fully saturated. It is then freed from excess of acid by decantation and treated in a tube or tower with air at 50° C. until a sample is completely disintegrated when boiled with dilute sodium carbonate solution. The opened-up material is worked up in the known manner.

*Example 3.*—Oxides of nitrogen in mixture with air are passed at a temperature of 40–50° C. over moist fir-wood for one or several hours; the oxides of nitrogen may be conveniently obtained by burning a mixture of air and ammonia in presence of a catalyst. Following this treatment the material is subjected for 24 hours to air at 50° C. The opening-up of the wood is complete and the product is free from splinters. The material is worked up in the known manner.

What we claim is:

1. The process which comprises causing a material containing cellulose to be acted upon in the presence of air by a compound of the group comprising nitric acid, nitrous acid and oxides of nitrogen.

2. The process which comprises steaming a material containing cellulose and causing it then to be acted upon in the presence of air by a compound of the group comprising nitric acid, nitrous acid and oxides of nitrogen.

3. The process which comprises impregnating a material containing cellulose with dilute nitric acid and subjecting it then to the action of air.

4. The process which comprises steaming a material containing cellulose, impregnating it with dilute nitric acid and subjecting it then to the action of air.

In testimony whereof, we affix our signatures.

HEINRICH HEIMANN.
HERMANN SEEFRIED.
IRNFRIED PETERSEN.
ALFONS BAYERL.